United States Patent [19]

Hinman, Jr.

[11] 3,983,455
[45] Sept. 28, 1976

[54] DIRECT TRANSFER-TRIP RELAYING SYSTEM

[75] Inventor: Walter L. Hinman, Jr., New Providence, N.J.

[73] Assignee: Westinghouse Electric Corporation, Pittsburgh, Pa.

[22] Filed: Jan. 15, 1975

[21] Appl. No.: 541,369

[52] U.S. Cl. .......................... 317/27 R; 317/28 R; 317/29 A
[51] Int. Cl.² ........................................ H02H 7/26
[58] Field of Search ............ 317/14 R, 27 R, 28 R, 317/27 A, 28 B, 29 R, 29 A, 29 B

[56] References Cited
UNITED STATES PATENTS

| | | | |
|---|---|---|---|
| 3,414,772 | 12/1968 | Sonnemann | 317/14 R |
| 3,423,634 | 1/1969 | Wagner | 317/27 R |
| 3,832,601 | 8/1974 | Hinman, Jr. et al. | 317/27 R |
| 3,882,361 | 5/1975 | Hinman, Jr. | 317/27 R |

*Primary Examiner*—J. D. Miller
*Assistant Examiner*—Patrick R. Salce
*Attorney, Agent, or Firm*—S. A. Seinberg

[57] ABSTRACT

This disclosure relates to a segregated phase comparison relaying system which is of the type wherein the current at each end of each of the conductors of a protected section of a three-phase transmission network is phase compared over a communication network for determining whether the fault of the faulted conductor is located within or external to the protected section of the transmission network. Under certain conditions it is desirable to transmit a breaker opening signal from one end (transmitting end) of the protected section to the other end (receiving end) thereof to provide a direct transfer-trip at the receiving end in response to the detection at the transmitting end of a fault which might not cause the breaker at the receiving end to open when using the segregated phase comparing system. Such direct transfer-trip resulting faults may be caused by numerous fault conditions such as, for example, the partial faulting of a voltage changing power transformer located within the protected network section, or the failure of a breaker other than the breaker at the receiving end to open and interrupt the fault current. As disclosed herein the direct transfer-trip signal is transmitted from the transmitting end to the receiving end by altering the normal phase comparing transmission into a peculiar predetermined pattern.

10 Claims, 7 Drawing Figures

DIRECT TRANSFER-TRIP RELAYING SYSTEM

BACKGROUND OF THE INVENTION

Segregated phase comparison relaying systems of the type illustrated herein are described and claimed in U.S. Pat. No. 3,893,008, dated July 1, 1975. No direct transfer-trip function is shown or described in said patent although this function has been provided in other relaying systems.

In accordance with this invention, the signal which would normally be used to determine the current flow condition at the two ends of the protected network section of a three-phase power transmission network are altered to provide a combination of signals which would normally never occur at all or never occur for the predetermined time intervals necessary to time out the direct transfer-trip timer.

DESCRIPTION OF THE PREFERRED EMBODIMENT

Figure 1:
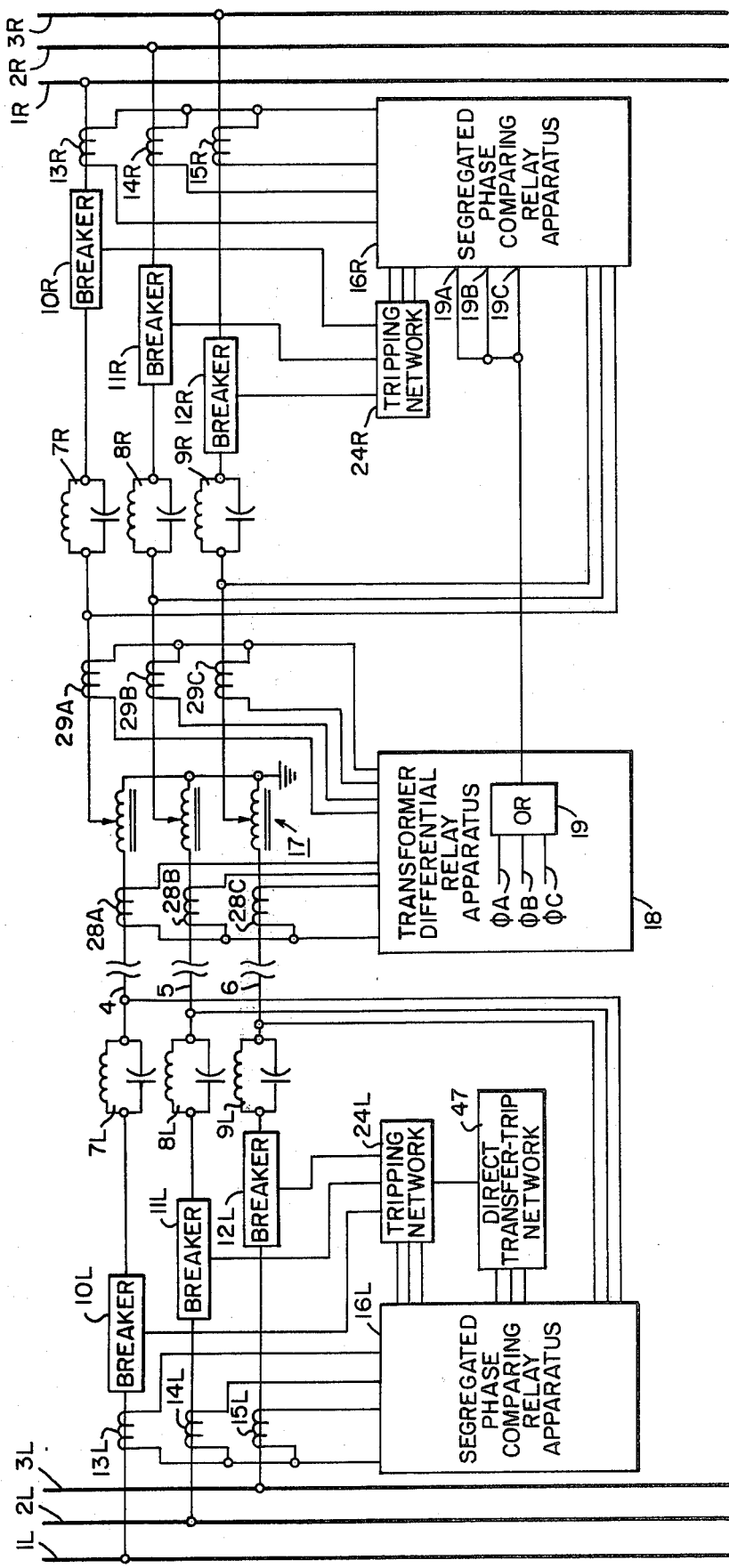
FIG. 1 is a block diagram of a relaying system embodying the invention.

Referring to the relaying system illustrated in FIG. 1, the reference characters 1L, 2L and 3L designate the three busses of a three-phase power supply energized from one or more sources (not shown). These busses energize the three phase conductors 4, 5 and 6 of a three-phase power transmission network through line traps 7L, 8L and 9L and circuit breakers 10L, 11L and 12L. Current transformers 13L, 14L and 15L are provided to monitor the current between the phase conductors 4, 5 and 6 and the busses 1L, 2L and 3L respectively. The current derived output quantities of the transformers 13L, 14L and 15L are supplied to a local segregated phase comparison relay apparatus 16L at one end (local) of a protected section of the power transmission line.

Figure 7:
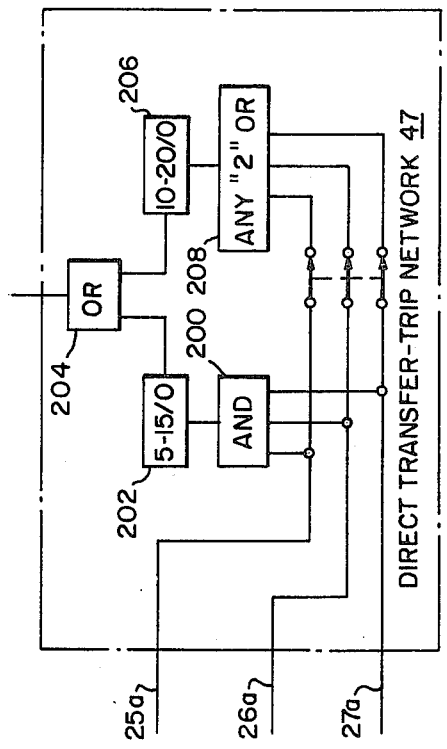

The remote ends of the phase conductors 4, 5 and 6 are connected through a three-phase power transformer 17, line traps 7R, 8R and 9R, circuit breakers 10R, 11R and 12R, and current transformers 13R, 14R and 15R to the remote power busses 1R, 2R and 3R which may be energized from other power sources (not shown). The current derived output quantities of the transformers 13R, 14R and 15R are supplied to a remote segregated phase comparison relay apparatus 16R at the remote end of the protected power transmission network. The relays 16L and 16R, except as modified by FIGS. 4, 5 and 7 hereof, are substantially identical to the apparatus shown and described in U.S. Pat. No. 3,893,008, dated July 1, 1975, to W. A. Strickland, Jr. and myself (application Ser. No. 402,687, filed Oct. 2, 1973).

The transformer 17 is protected by a differential relay apparatus 18. Any suitable differential relay which will provide an output signal in the event of one or more phase faults therein can be used. One such type of relay is shown and described in U.S. Pat. No. 3,414,772, dated Dec. 3, 1968 to W. K. Sonnemann. In the case of the Sonnemann relay, the three-phase transformer 17 comparison apparatus would require a relay for each phase and the output circuits of the three relays would be connected to the three inputs ($\phi$A, $\phi$B, $\phi$C) of an OR network 19 having its output connected to the input conductors 19A, 19B and 19C of the transmitter frequency control 76 (shown in greater detail in FIG. 6) of the relay apparatus 16R.

The current derived signals for the differential relay apparatus 18 are provided by the current transformers 28A, 28B, 28C, 29A, 29B and 29C associated respectively with the input and output circuits of the three-phase power transformer 17. When one or more of the windings of the transformer 17 faults, one or more of the inputs of the OR network 19 will be provided with a logical 1 signal and a logical 1 signal will be supplied to the input conductors 19A, 19B and 19C of the apparatus 16R.

Figure 6:
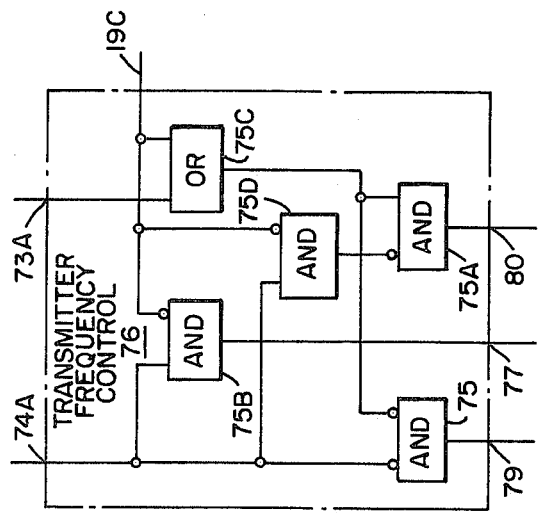
FIGS. 4, 5, 6 and 7 are block diagrams of certain of the elements of the network of FIG. 3.

The transmitter receiver 78 of the apparatus 16R, see FIG. 6, transmits any one of three output signals depending upon which of the terminals 77, 79 or 80 is energized with a logical 1 signal (the other two of which will provide logical 0 signals). A logical 1 signal at terminal 77 causes the transmission of a guard signal, a logical 1 signal at terminal 79 causes a transmission of a trip negative (T-N) signal and a logical 1 signal at terminal 80 causes the transmission of trip positive (T-P) signal. Each replaying apparatus 20–22 provides the guard, the T-N and the T-P signals. The current polarity of each phase conductor is determined by the T-P and T-N signals of the corresponding apparatus 20–22. In the illustrated embodiment, a transformer fault and the resulting logical 1 signal on the conductors 19A, 19B and 19C provides a logical 1 signal at output terminal 80 of the relaying networks 20–22 of the apparatus 16R so that all three of its transmitters-receivers 78 are transmitting T-P signals of each set (T-N and T-P) of its transmitted intelligence. If the intelligence is transmitted from the remote to the local ends a multiplexing signal transmission, as a continuous series of T-P signals would be sent. While the illustrated direct transfer-trip operation responds to the faulting of a line voltage transformer, other fault conditions might generate the direct transfer-trip signal as, for example, the failure of the primary breaker to interrupt fault current and the necessity of tripping other back-up breakers through which the fault current flows to the failed breaker. The use of a direct transfer-trip function is well known and the present invention is directed to the new and inventive construction by which the direct transfer-trip signal is supplied from a first power network location having the sensing element to a second power network location where the breaker or breakers to be tripped are located.

The relaying networks 20, 21 and 22 of the relay apparatus 16L and 16R may be identical, however, the apparatus 16L would not require the input conductors 19A, 19B and 19C since the local end does not include the circuit to institute a direct transfer-trip signal as, for example, the differential relay apparatus 18. The tripping networks 24L and 24R associated respectively with the relays 16L and 16R may also be identical except that the input connections thereto from the direct transfer-trip network 47 would not be used since the apparatus 16R is not arranged to trip its associated breakers 10R, 11R and 12R in response to the reception of a direct transfer-trip signal.

Figure 3:
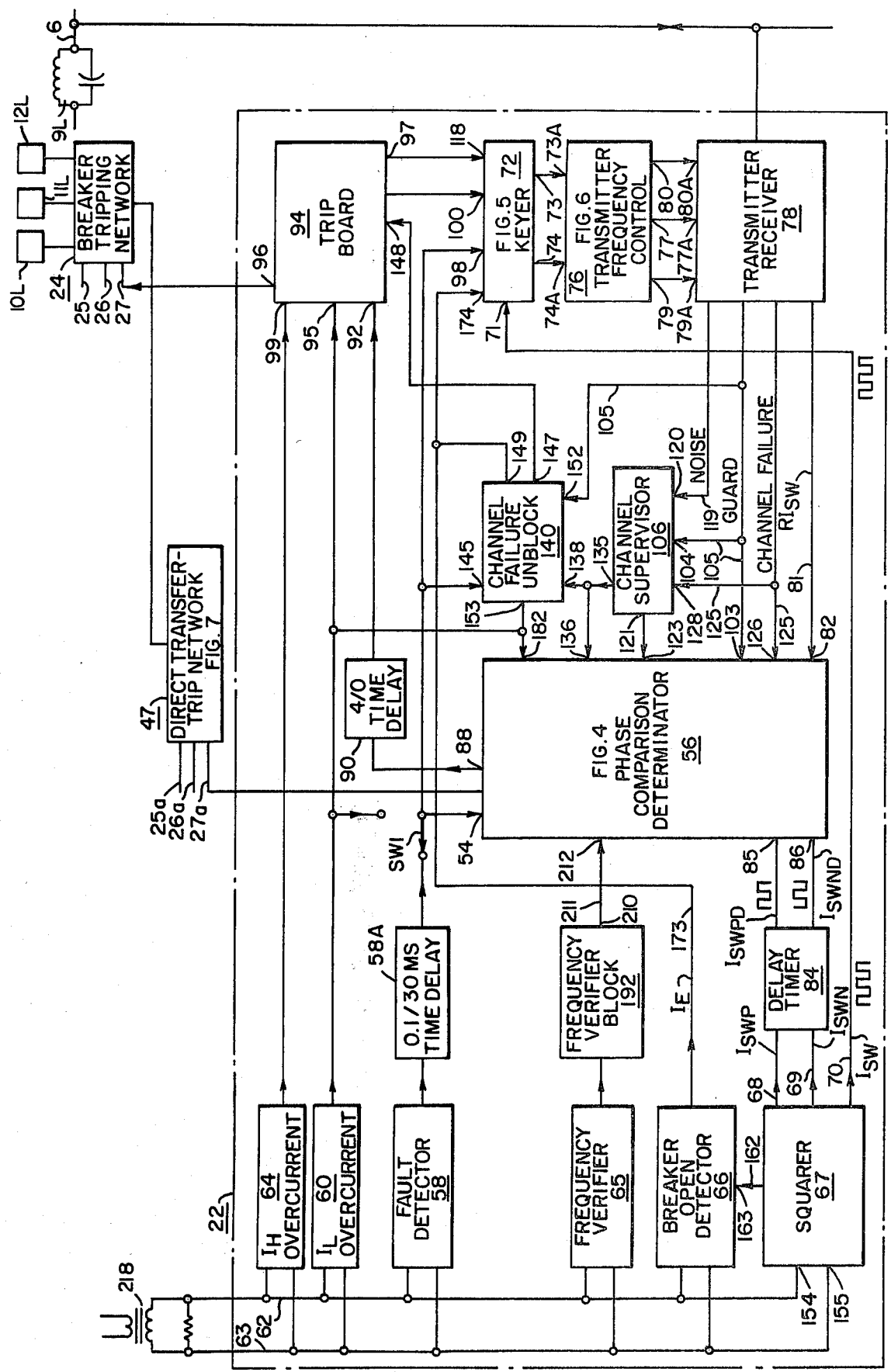
FIG. 3 is a block diagram of one relaying network of the apparatus of FIG. 2.
Figure 5:
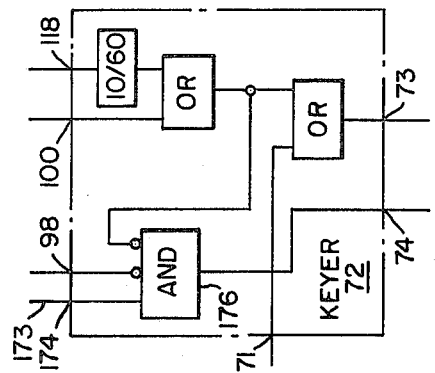
Figure 4:
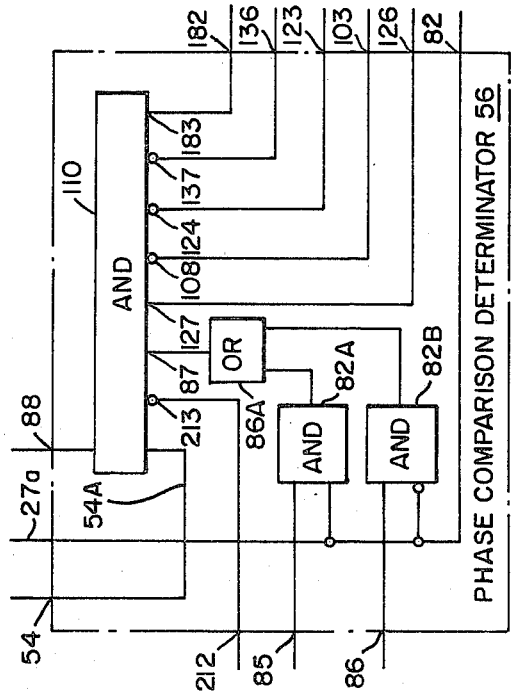

The networks associated with the relays 16L and 16R 20–22 may best be understood by reference to FIGS. 3–6. The blocks illustrated in FIG. 3 with the exception of the transmitter frequency control 78 are, for all intents and purposes, the same as are shown and described in the said U.S. Pat. No. 3,893,008, to Strickland and myself. FIGS. 4 and 5 are substantially identical to FIGS. 3 and 7 of the said patent and have been reproduced to aid in the description of operation.

As illustrated in FIG. 3, the current signal supplied from the current transformer 15L is supplied to an isolating transformer 218. The busses 62 and 63 are connected to the output terminals of the secondary winding of the isolating transformer 218 which are connected together by a loading resistor so that the signal between the conductors 62 and 63 is a voltage signal proportional to the magnitude and polarity of the current flowing in the conductor 6. This signal is supplied to a plurality of sensing devices which includes a fault detector 58 which provides a logical 1 output signal when fault current is flowing in the conductor 6. A suitable detector 58 would be that illustrated in U.S. Pat. No. 3,654,516 to Traversi. In the event a fault occurs, the detector 58 supplies a logical 1 signal to a time delay 58A. After a 0.1 m.s. delay, a logical 1 signal is supplied to the input terminal 54 of the phase comparison determinator 56 and, as illustrated in FIG. 4, to the input terminal 54A of an AND network 110.

The $I_L$ overcurrent network 60 is also energized from the busses 62 and 63 when the line current is above the maximum expected charging current in which case network 60 supplies a logical 1 signal to the input terminal 182 (see FIG. 4) of the phase comparison determinator 56, to the input terminal 145 of the channel failure unblock network 140 and to the input terminal 95 of the trip board 94. As illustrated in FIG. 4, this logical 1 input is supplied from terminal 182 to an input terminal 183 of the AND network 110 to provide an arming signal. An AND network is included in the trip board 94 and is armed by the $I_L$ network 60 output. This arming is necessary before any logical output signal can exist at the output terminals 96 and 97 of the trip board 94.

The operation of the logical 1 signal on the channel failure unblock 140 is more fully illustrated in my said patent and since its discussion in this application is not essential for an understanding of the invention claimed herein, a further description will not be given.

The $I_H$ overcurrent network 64 is energized from the busses 62 and 63 and normally provides logical 0 signal to the input terminal 99 of the trip board 94. In the event of the occurrence of an extremely high fault current in the conductor 6, this network 64 provides a logical 1 signal to the input terminal 99 for immediate energization of the output terminal 96 with a logical 1 signal, for the energization of the input terminal 100 of the keyer 72 with a logical 1 signal, and for energization of the input terminal 73A of the transmitter frequency control 76 through circuitry illustrated in FIG. 5. The logical 1 signal at the terminal 73A causes a logical 1 output signal at the output terminal 80 through circuitry illustrated in FIG. 6 to cause the transmitter-receiver 78 to send a T-P signal to the corresponding transmitter-receiver of the apparatus 16L which results in a tripping of the breaker 12L, without waiting for the phase comparison of the currents at the two ends of the line 6, as is required by actuation of the fault detector 58 without the actuation of the $I_H$ overcurrent network 64. The frequency verifier network 65, acting through the frequency verifier block 192, normally provides a logical zero signal at the input terminal 212 of the phase comparison determinator 56 and forwarded therethrough to the NOT input terminal 213 of the AND network 110, which partially arms the AND network 110.

As long as the channel interconnecting the transmitter-receivers of the two networks 22 associated with the relays 16R and 16L is operative, a logical 1 signal will be supplied by the transmitter-receiver 78 through the conductor 125 and the input terminal 126 of the phase comparison determinator network 56 to the input terminal 127 of the AND network 110, which again partially arms the AND network 110. Under normal operating conditions of the conductor 6, the transmitter-receiver 78 will be receiving guard signal and the conductor 105 will be energized with a logical 1 signal as will be the input terminal 103 of the phase comparison determinator 56. A logical 1 signal will thusly be forwarded to the NOT input terminal 108 of the AND network 110, which partially disarms the AND network 110. As long as the noise on the communicating system is below a predetermined magnitude, a logical 0 signal will be supplied through the conductor 119, a channel supervisor 106, and the input terminal 123 of the phase comparison discriminator 56 to the NOT input terminal 124 of the AND network 110. Thus maintains a partial arming of this AND network. In the event that the noise on the communication system exceeds a predetermined safe level, a logical 1 output signal will be provided at the NOT input terminal 124 of the AND network 110 and disarm this AND network.

The details of the channel supervisor 106 are completely shown in my said U.S. Pat. No. 3,893,008. Normally, the output terminal 135 of the channel supervisor 106 provides a logical zero signal through the input terminal 136 of the determinator 56 to the NOT input terminal 137 to partially arm the AND network 110. In the event of a channel failure, the channel supervisor 106, after a suitable time delay, will provide a logical 1 output signal at its output terminal 135 and therefrom to the NOT input terminal 137 of the AND network 110 to disarm the AND network 110.

When a fault is detected by the fault detector 58 it applies a logical 1 signal to the input terminal 54A of AND network 110 and to the input terminal 98 of the keyer 72. This places a logical 1 signal at the NOT input terminal of the AND network 176 to which it is connected (see FIG. 5), thereby causing a logical 0 output signal to be supplied to the input terminal 74A of the transmitter frequency control 76. When this occurs, the AND network 75B thereof (see FIG. 6) will be disarmed. The terminal 77 will then no longer supply the logical 1 signal and the transmitter receiver 78 will terminate its conduction of the guard signal. This logical 0 signal at the terminal 74A will also be supplied to the left-hand NOT input terminal of the AND network 75 and to the left-hand input terminal of the AND network 75D. The AND network 75D has its output connected to the left-hand NOT input terminal of the AND network 75A and will provide a logical 0 signal thereto. When this occurs, the logical 0 and the logical 1 signals supplied by the quantity $I_{SW}$ through the keyer 72 to the input terminal 73A will provide a series of logical 0 and logical 1 signals to the OR network 75C. This series of logical 0 and logical 1 output signals from the OR network 75C alternately cause the AND networks 75 and 75A to provide logical 1 signals to the terminals 79 and 80. The transmitter establishes the T-P signal when the AND network 75A has a logical 1 output signal and the T-N signal when the AND network 75 has a logical 1 output signal.

Figure 2:
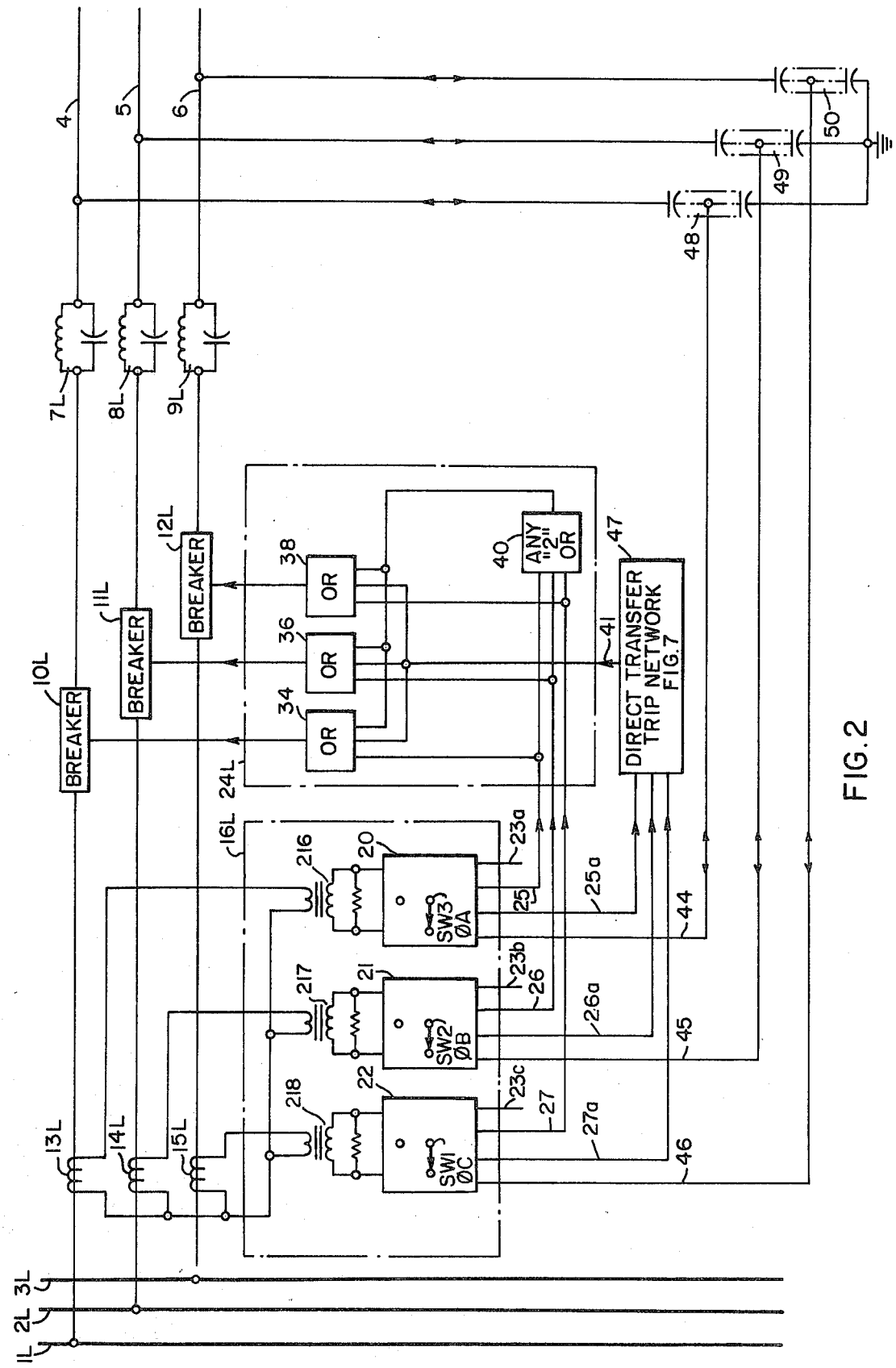
FIG. 2 is a block diagram of the local relaying apparatus of the system of FIG. 1.

If the fault detector 58 of the apparatus 16R also detects the fault, the transmitter receiver 78 at the apparatus 16L will provide a series of logical 1 and logical 0 signals through the conductor 81 and the input terminal 82 of the phase comparison discriminator 56 (see FIG. 4) to the NOT and the normal input terminals of the AND networks 82B and 82A respectively. At this same time, the delay timer 84 is supplying logical 1 and logical 0 signals, in opposite phase relation, through the input terminals 85 and 86 of the phase comparison discriminator 56 to the AND networks 82A and 82B. The AND networks 82A and 82B will then be effective to compare the phase relationship of the $R_{ISW}$ signal to the $I_{SWPD}$ and $I_{SWND}$ signals from the delay timer 84. If two logical 1 signals are simultaneously supplied to the AND network 82A or a logical 1 and a logical 0 signal to the AND network 82B, the OR network 86A will be effective to provide a logical 1 signal to the input terminal 87 of the AND network 110. When this occurs, the AND network 110 will provide a logical 1 output signal at its output terminal 88 to initiate the timing out of the time delay 90. If this logical 1 signal exists for 4 milliseconds or longer, a logical 1 output signal will be supplied to the input terminal 92 of the trip board 94. As is more thoroughly disclosed in my said patent, this satisfies the AND network in the trip board 94 (armed by the $I_L$ overcurrent network 60) and the resulting logical 1 output signal at the output terminal 96 is supplied by the conductor 27 to one terminal of an OR network 38 (see FIG. 2) and one terminal of an ANY 2 OR network 40 of the breaker tripping network 24L. The OR network 38 will thereupon provide a breaker tripping signal to the breaker 12L which will trip and disconnect the line conductor 6 from the bus 3L.

Similarly, the networks 20 and 21 are provided with output conductors 25 and 26 which connect to one terminal of the OR networks 34 and 36, respectively, and to the two other input terminals of the ANY 2 OR network 40. Therefore, whichever one of the networks 20, 21 or 22 respond to detect an internal fault, the proper one of the breakers 10L, 11L or 12L will be energized to disconnect the faulted line conductor from the bus. If however, two busses should be faulted and two logical 1 signals are supplied to the ANY 2 OR network 40, the logical signal at its output terminal which is connected to a second input terminal of each of the OR networks 34, 36 and 38 will result in the actuation of all three of the breakers 10L, 11L and 12L to disconnect the line conductors 4, 5 and 6 from the busses 1L, 2L and 3L.

Normally, there is never a time when all three received T-P signals are simultaneously received and any two T-P signals are simultaneously received only for a nominal time interval of 2.8 milliseconds for a three-phase power line operating at 60 Hz. Therefore, the provision of the logical 1 signals to the input terminals 25a, 26a and 27a from the networks 20, 21 and 22 during normal phase comparison relaying will not cause the AND network 200 (see FIG. 7) to supply a logical 1 output signal to the timer 202, so that the timer 202 should never time out to provide a logical 1 input signal to the terminal of the OR network 204 to which it is connected. To ensure that the timer 202 doe not time out accidentally should the transient current in the lines 4, 5 and 6 cause 3 T-P signals for a short period of time, as for example, 5 milliseconds or less, the timer 202 is provided.

The timer 206 is controlled by the output of the ANY 2 OR network 208 and is adjusted so that its timing out period is longer than that of the timer 202 and sufficiently long so that any overlap of the T-P logical 1 signals to two of the inputs 25a, 26a or 27a due to phase comparison relaying by the phase comparison relaying apparatuses 16R and 16L will not cause timer 206 to time out. The purpose of the ANY 2 OR network 208 is to permit operation of the direct transfer-trip network 47 when 3 T-P signals are continuously supplied over the communication network. However, should one of the communication channels fail to supply its T-P signal, which would prevent the AND network 200 from supplying a logical 1 signal to the OR network 204, the presence of any two of the T-P signals will actuate the ANY 2 OR network 208, if the two T-P signals remain continuously present for the timing out period of the timer 206. This will then cause timer 206 to time out.

When either one of the timers 206 or 202 times out, a logical 1 output signal is provided by the OR network 204 to the input terminal 41 (FIG. 2) of the tripping network 24L. This terminal 41 is connected to a third input terminal of each of the OR networks 34, 36 and 38, and when energized with a logical 1 signal will cause tripping of all of the breakers 10L, 11L and 12L in response to a direct transfer-trip relaying operation.

Referring again to the direct transfer-trip energizing apparatus of the transformer differential relay apparatus 18, it will be appreciated that upon the occurrence of a fault in the transformer 17 in any one or more of the phase A, phase B or phase C branches, a logical 1 signal will be supplied to the OR network 19 thereof. The resulting logical 1 output signal of the OR network 19 energizes the input conductors 19A, 19B and 19C of the networks 20, 21 and 22 of the apparatus 16R. When this occurs, as will be apparent from FIG. 6, a logical 1 signal will be supplied to the NOT input terminal of the AND network 75B to interrupt the logical 1 output guard signal at the output terminal 77. The logical 1 signal supplied to the NOT input terminal of the AND network 75D causes it to maintain a logical 0 signal at the NOT input terminal of the AND network 75A irrespective of which logical signal is supplied to the input terminal 74A. The logical 1 signal on the conductor 19C causes the OR network 75C to apply a logical 1 signal to the normal input terminal of the AND network 75A and provides a continuous logical 1 output signal to input terminal 80A of the transmitter-receiver 78 so that it continuously transmits a T-P signal. Similarly, the energization of the conductors 19A and 19B will cause the transmitter-receivers 78 associated with the networks 20 and 21 of the apparatus 16R to continuously transmit a T-P signal so that the networks 20, 21 and 22 of the apparatus 16L will continuously and concurrently be supplied with 3 T-P direct transfer-trip signals to the inputs 25a, 26a and 27a of the direct transfer-trip network 47 to trip all of the breakers 10L, 11L and 12L.

What is claimed and is desired to be secured by United States Letters Patent is as follows:

1. In a segregated phase relaying system for protecting a section of an alternating potential polyphase power transmission network having first and second end portions, said system comprising, first and second protective relaying networks respectively individually associated with said first and second end portions of said network section, each of said relaying networks comprising three current sensors individually associated with three of the conductors of said transmission network, each of said sensors providing first and second output signals during first and second portions of the cycle of the current sensed thereby, communicating means interconnecting said relaying networks and effective to transmit three sets of communicated signals from one of said relaying networks at one of said end portions of said transmission network to the other of said relaying networks at the other of said end portions of said transmission network, each of said sets of communicated signals being individual to said sensors of said one relaying network, each said set of signals comprising first and second transmitted signals corresponding respectively to said first and second output signals of the said sensor with which it is associated, a fault detector associated with said one end portion of said transmission network and effective to provide a fault signal upon the occurrence of a fault in said protected section of said transmission network, said one relaying network including transfer trip initiating means, said trip initiating means being effective when actuated to cause said communicating means to prevent the transmission of said sets of communicated signals under control of said sensors and to cause said communicating means to initiate the transmission of a selected one of said transmitted signals of at least two of said sets of communicated signals, said other relaying network including at least three signal comparing networks, each of said comparing networks having first and second input circuits and an output circuit, first circuit means individually connecting said first input circuits of said networks to individual ones of said sensors of said other relaying network, said other relaying network including a receiver energized by said communicated signals, second circuit means connecting said second input circuits of said networks to said receiver and effective to individually energize said second input circuits of said networks with individual ones of said sets of said communicated signals received by said receiver, a tripping network comprising three tripping circuits, third circuit means individually connecting said tripping circuits to individual output circuits of said comparing networks, each said comparing network being effective when both of its input circuits are receiving a selected one of said output signals from the said sensor which it is associated and a predetermined one of said communicated signal of said sets of signal to actuate its respective said tripping circuit, and fourth circuit means interconnecting said receiver and said tripping network and effective to provide a tripping output when said receiver is receiving all of said selected ones of all of said sets of communicated signals which are being transmitted.

2. The system of claim 1 in which said selected one of said transmitted signals is the same said transmitted signal of each said at least two of said sets of communicated signals.

3. The system of claim 2 in which said transfer trip initiating means is effective to initiate the transmission of a selected one of said transmitted signals of three of said sets of communicated signals.

4. The system of claim 3 in which said fourth circuit means is effective to provide said tripping output when said receiver is receiving said selected ones of two of said sets of communicated signals.

5. A relaying apparatus for a three phase alternating current transmission network, said apparatus comprising a current sensors individually associated with each of the three conductors of said network, each of said sensors providing first and second output signals during first and second portions of the cycle of the current sensed thereby, a transmitting network effective to transmit intelligence indirectly to each of said three conductors, a first control network interconnecting each of said sensors with said transmitting network, said control network being effective to modulate said transmitting network to contact said intelligence, first and second fault detecting means having their outputs connected to said control network, said first fault detecting means being effective to respond to first operating faults of said transmission network, said second fault detecting means being effective to respond to operating faults of each transmission network to which said first fault detecting means does not respond, said first control network being effective to render said transmitting network effective to transmit intelligence containing said first and second output signals from each of said sensors in the absence of a fault detected by said second fault detecting means during at least the time intervals that said first fault detecting means is responding to said first operating fault of said transmitting network, said second fault detecting means being effective to render said first control network ineffective to modulate said transmitting network into a condition to transmit intelligence under control of said sensors and to transmit the same intelligence for each of said three conductors.

6. A segregated phase comparison relaying apparatus for a three phase power transmission line, said apparatus comprising, transmitting means adapted to transmit three separate intelligence containing signals, each of said intelligence signals comprising digital data bits, current actuated means individually responsive to the current in the three conductors of said transmission line, and controlling said transmitting means, each of said current actuated means being responsive to a separate one of said intelligence signals to provide the said digital data bits of its said associated said signal in accordance with the polarity of the said current to which it is responsive, and fault responsive means, said fault responsive means being effective when responding to a fault to actuate said transmitting means into a condition in which all of said data bits of each of said signals are of the same character.

7. A relaying apparatus for a three phase alternating current transmission network, said apparatus comprising, a current sensor individually associated with each of the three conductors of said network at a first and second locations along said transmission network, each of said sensors providing first and second output signals during first and second portions of the cycle of the current sensed thereby, a receiver having an output comprised of first and second sets of signals representing the current in each of said three conductors at said second location along said transmission network, three protective relaying networks, each of said networks having first and second input circuts and an output circuit, first circuit means individually connecting said first input circuit of said networks to said sensors for individual energization by their said output signals, second circuit means connecting said second input circuit of said networks to said receivers for individually energizing said second input circuits by individual ones of said first and second sets of signals, three breaker tripping circuits, third circuit means individually connecting said tripping circuits to said output circuit of said networks, each of said networks being effective to actuate its said associated said third circuit means said networks connecting said tripping circuits to said receiver, said third circuit means being effective when all of said sets of signals are of the same character to actuate all of said tripping circuits.

8. A segregated phase comparison relaying apparatus for a three-phase power transmission line, said apparatus comprising, receiving means adapted to receive three separate intelligence containing signals, each of said intelligence signals comprising digital data bits, said receiving means having a first set of three output circuits, said circuits being individually energized by said signals with logical 1 and logical 0 signals depending upon the character of said digital bits of the said signal with which it is energized, current actuated means individually responsive to the current in the three conductors of said transmission line and having a second set of three individually energized output circuits, each of said three output circuits of said second set being individually energized with logical 1 and logical 0 signals depending upon the polarity of the current in the said conductor to which it is responsive, three protective relaying networks individually coupling said output circuits with said output circuits of said second set, each of said networks being effective to provide a first output signal when the pair of logical signals supplied thereto have a first relationship, a breaker tripping network connected to said networks and effective to limit a tripping signal when a said network provides its said first output signal, said tripping networks being connected to each of said output circuits of said first set and effective to provide a breaker tripping signal when all of the logical signals are identical.

9. A protective relay apparatus for individually protecting the three phase conductors of a three phase transmission line, said apparatus comprising, transmitting means for transmitting intelligence, said intelligence comprising three sets of transmitted intelligence, each said set of transmitted intelligence including at least a first and a second control signal, first operating conditions sensing means, said first operating condition sensing means including fault detecting apparatus and three current sensors, said current sensors being individually associated with said three conductors and effective to sense the polarity of current flow through the said conductor with which it is associated, intelligence modulating means interconnecting said first operating condition sensing means and said transmitting means, said modulating means being effective to individually modulate said sets of transmitted intelligence by the individual said circuit sensors, said modulating means being effective at least during the periods that said fault detecting apparatus detects a fault operating condition of said transmission line to cause said transmitting means to transmit said first and second control signals of at least one of said sets of transmitted intelligence, the said one of said control signals of said one set being determined by the polarity of the current sensed by the one of said current sensors which is individual to said one set of intelligence, second operating condition sensing means connected to actuate said modulating means, said modulating means when actuated by said second operating condition sensing means being effective to cause said transmitting means to transmit the same said signal of at least two of said sets of intelligence.

10. The apparatus of claim 9 in which said fault detecting apparatus includes three fault detectors, said fault detectors being individually paired with said current sensors, said pairs being individually associated with said three conductors, said modulating means being effective to cause said transmitting means to transmit a said set of said intelligence for each of said pairs of fault detectors and current sensor at least when said fault detectors of said pair of fault detector and current sensor responds to a fault operating condition of the said phase conductor with which said pair of fault detectors and current sensor is associated, said second operating condition sensing means being effective to cause said transmitter to transmit the same said signal of all three of said sets of intelligence.

* * * * *